United States Patent [19]
Kita et al.

[11] Patent Number: 6,059,987
[45] Date of Patent: May 9, 2000

[54] IONIC CONDUCTIVE MATERIAL AND ELECTROCHEMICAL DEVICE COMPRISING THE SAME

[75] Inventors: Fusaji Kita, Suita; Akira Kawakami, Takatsuki, both of Japan; Yurii Yagupolskii, Kyiv, Ukraine; Tatyana Savina, Kyiv, Ukraine; Natalya Kirij, Kyiv, Ukraine; Leonid Markovsky, Kyiv, Ukraine

[73] Assignee: Hitachi Maxell, Ltd., Osaka-fu, Japan

[21] Appl. No.: 08/998,663

[22] Filed: Dec. 29, 1997

[30] Foreign Application Priority Data

Dec. 26, 1996 [JP] Japan .................................. 8-348633

[51] Int. Cl.⁷ .................................................. H01M 10/40
[52] U.S. Cl. .......................... 252/62.2; 429/316; 429/314; 429/317; 429/188; 252/518.1; 252/519.4; 252/521.3; 252/523.5
[58] Field of Search .............................. 252/62.2, 518.1, 252/519.4, 521.3, 523.5; 429/316, 314, 317, 188

[56] References Cited

U.S. PATENT DOCUMENTS

| | | |
|---|---|---|
| 5,260,143 | 11/1993 | Voss et al. . |
| 5,534,370 | 7/1996 | Kita et al. . |
| 5,789,106 | 8/1998 | Rosenmeier et al. ................... 252/62.2 |

FOREIGN PATENT DOCUMENTS 765843  3/1995  Japan .

*Primary Examiner*—C. Melissa Koslow
*Attorney, Agent, or Firm*—Birch, Stewart, Kolasch & Birch, LLP

[57] ABSTRACT

An ionic conductive material chosen from a metal or a hydrogen ion and on anion portion comprising a resonance structure containing a Group IVB atom as the anion portion, and an electron-withdrawing group which is bonded to said resonance structure through a Group VIB atom, which has a good high voltage stability. These materials find applicability in lithium cells.

24 Claims, No Drawings

IONIC CONDUCTIVE MATERIAL AND ELECTROCHEMICAL DEVICE COMPRISING THE SAME

BACKGROUND OF THE INVENTION

1. Field of the Invention

The present invention relates to an ionic conductive material and an electrochemical device comprising the same. More specifically, it relates to an ionic conductive material and an electrochemical device having excellent high voltage stability.

2. Prior Art

Manganese dioxide lithium cells, which are representative of electrochemical devices, are in ever increasing demand because they have a high voltage of 3 V and a high energy density. Furthermore, recently, lithium ion secondary cells have been developed and the demand for them is increasing rapidly because they can give a high voltage of about 3.6 V.

Hitherto, $LiClO_4$ was used as the electrolyte for this type of cell, but it lost some desirability because of stability concerns. Furthermore, the stability and reliability may be improved by dissolving or dispersing various salts in a polymer such as polyethylene oxide (PEO) to form solid electrolytes. However, this tends to reduce the ionic conductance considerably.

Besides $LiClO_4$, the use of organic lithium salts such as $LiB(C_6H_3)_4$, $LiCF_3SO_3$, $LiCF_3CO_2$, $LiN(CF_3SO_2)_2$, and $LiC(CF_3SO_2)_3$ has been proposed for organic electrolytes. (See the specifications of Japanese Kokai Publication No. 7-65843 (1995) and U.S. Pat. No. 5,260,143.)

However, the above $LiB(C_6H_5)_4$ and the like have insufficient stability at high voltages and there is a problem in that, depending on the solvent used, the storage stability is poor. Furthermore, the liquid ionic conductive material (electrolytic solution), in which the above $LiB(C_6H_5)_4$ is dissolved in an organic solvent, discolors on storage and a portion of the electrolyte solvent is polymerized. Then, as a result, a cell which uses this liquid ionic conductive material (electrolytic solution) has a problem in that the cell capacity deteriorates on storage.

Organic salts, such as $LiCF_3SO_3$, $LiCF_3CO_2$, $LiN(CF_3SO_2)_2$, and $LiC(CF_3SO_2)_3$ are much safer than $LiClO_4$, but there are problems in that they show insufficient oxidation stability, their ionic conductivity is low, some materials cannot be used as the current collector of the electrode, and such salts are expensive.

SUMMARY OF THE INVENTION

Therefore, an object of the present invention is to provide an ionic conductive material and an electrochemical device which overcomes the problems of the prior art ionic conductive materials as described above and to propose a material having excellent stability at high voltages.

The present invention provides an ionic conductive material chosen from a metal ion or a hydrogen ion and an anion portion comprising a resonance structure containing a Group IVB atom, and an electron-withdrawing group which is bonded to said resonance structure portion through a Group VIB atom. It also provides an electrochemical device which uses this ionic conductive material, especially non-aqueous cells. The stability of the electrochemical device at high voltages can also be improved by the use of the ionic conductive material of the present invention.

(Note that in the USA, Group IVB may be called Group IVA, and Group VIB may be called Group VIA.)

DETAILED DESCRIPTION OF THE INVENTION

In the present invention, the above compound used as the ionic conductive material may be a simple salt which serves as a solute when it is dissolved in an organic solvent to give a liquid ionic conductive material (electrolytic solution), while the compound may be a solid ionic conductive material when its molecule is large. In the latter case, the above compound may have several cations and parts to be paired with them within each molecule. In the present invention, these parts are called anion portions and may include the case of the use of simple metal salts or polymers. Thus, these anion portions are preferably made up with the resonance structure.

In the present invention, the electrochemical device is understood to mean an device having electrodes and an ionic conductive material such as cells, electrolysis systems, electrochemical sensors, and the like. The present invention is particularly suited to cells and is ideal for non-aqueous cells which must be able to withstand high voltages. The effectiveness of the ionic conductive material of the present invention is clearly revealed with cells having a maximum voltage of 4.0 V or greater according to a lithium reference electrode. The effectiveness of the ionic conductive material of the present invention is more clearly revealed with cells having a maximum voltage of 4.1 V or greater, and the effectiveness of the ionic conductive material of the present invention is further revealed to be exceptional for cells with a maximum voltage of 4.2 V or greater. According to the use of the ionic conductive material of the present invention even better results may be obtained. For this reason, the explanations below mainly use cells as examples, but the equipment of the present invention is not limited to cells.

The Group IVB atom which forms the center of the anion (i.e, C, Si, Ge, etc.) has relatively low electronegativity and these atoms are desirable in forming the center of the anion, because, even when the cell voltage is 3 V or greater, electrons are not easily released and the excellent oxidation stability can be expected for the ionic conductive materials. Furthermore, the three resonance structure groups to stabilize them which are bonded through ($SO_2$ groups or CO groups) can be bonded to the Group IVB atoms and thus the Group IVB atoms are more desirable because of an improvement of the oxidation stability. As a resonance structure bonding group, the $SO_2$ group is the most desirable. As the molecular weight is low, C (carbon) is the most desirable among the Group IVB atoms. Therefore, the most desirable resonance structure portion is $(—SO_2)_3C$.

The most characteristic part of the compound used in the present invention (hereinafter called the compound of the present invention) is the resonance structure of the anion portion which is stabilized by the bonding of an electron-withdrawing group through a Group VIB atom as a countermeasure to prevent oxidization of the anion portion as described above.

The above electron-withdrawing organic substituent attracts the electron of the carbon atom at the center of the anion and the electron density of the atom at the anion center is reduced. Thus, oxidation is prevented because electrons are not easily extracted from the anion center. However, the Group VIB atom which lies between the electron-withdrawing organic substituent and the anion portion has the highest electronegativity as an atom with two bonding possibilities, and the effectiveness of the electron-withdrawing group is further improved. Furthermore, the substituent is lengthened by the size of the Group VIB atom, and the steric hindrance becomes enlarged. In particular, the high voltage stability improves on combination with the current collector metal of the positive electrode. The effectiveness is particularly great with a current collector which forms a valency of 3 or more during dissolution, such as aluminum and the like.

For example, the $(CF_3SO_2)_2NLi$ of the prior art elutes the aluminum current collector at 4 V and even $(RfOSO_2)_2NLi$ does so up to 4.5 V, and $(CF_3SO_2)_3CLi$ also does so at 4.6 V. However, the $(CF_3CH_2OSO_2)_3CLi$ of the present invention very surprisingly does not elute it even up to about 5.5 V. Oxygen, sulphur and the like can be considered as the Group VIB atom, preferably oxygen, as it is difficult for it to form two or more bonds and the electron-withdrawing substituent can bond to the anion portion with little steric hindrance and, thus, the high voltage stability can be further increased.

Halogenated alkyl groups, cyano groups and the like are examples of the electron-withdrawing organic substituent bonded through the Group VIB atom. However, halogenated alkyl groups are particularly preferable and among them, fluoroalkyl groups are preferable. The number of carbon atoms in the alkyl group is not particularly limited but as the number of carbon atoms in the halogenated alkyl group increases, so does the steric hindrance effect. Thus, it is desirable to have no more than about 20 carbon atoms in one unit of each anion portion when the ionic conductive material is dissolved in an organic solvent.

Furthermore, the halogenated alkyl group may also include a nitrogen or an oxygen atom. The halogenated alkyl group is preferable, because the steric hindrance increases compared to using no non-halogenated carbon atom, and thus, the high voltage stability of the current collector of the positive electrode increases in comparison to the case where the non-halogenated atom is removed, when the halogenated alkyl group is bonded through a non-halogenated carbon atom to a Group VIB atom. A specific example of a compound having a halogenated alkyl which is bonded to a Group VIB atom through a carbon molecule which is not halogenated is given in formula (I) below:

$$[(Rf-Z-Y)_3-X]_nM \qquad (I)$$

wherein M is a hydrogen or metal atom; n is an integer representing the valency of the cation; X is a Group IVB atom; Y is an $SO_2$ or CO group; Z is a Group VIB atom; Rf is an organic electron-withdrawing group containing a fluorine atom in which no halogen atom or at least one hydrogen atom is bonded to the carbon atom in the bonding portion with the Group IVB atom, but Rf may be bonded in at least two positions to the same or a different anion portion through a Group VIB atom.

Examples of specific compounds are $(CF_3CH_2OSO_2)_3CLi$ and $(CF_3CF_2CH_2OSO_2)_3CLi$ and the like.

Furthermore, halogenated alkyl groups with branching in the middle are desirable as the high voltage stability is further increased. A specific example of such a branched structure is $((CF_3)_2CHOSO_2)_3CLi$.

In the compound of the present invention, other than hydrogen ions, metal ions can be used as the counter ion. Examples of such metal ions are alkali metal ions such as lithium, sodium, potassium and other such ions, and alkali earth metal ions such as magnesium, calcium, and other such ions. Alkali metal ions are particularly preferred while lithium ions are the most desirable.

In the manufacture of the liquid ionic conductive material (electrolytic solution) which uses the compound of the present invention, it is desirable to dissolve the above compound in an organic solvent. Examples of this organic solvent are esters such as propylene carbonate, ethylene carbonate, butylene carbonate, γ-butyrolactone, γ-valerolactone, dimethyl carbonate, methyl propionate, butyl acetate, and the like; ethers such as 1,2-dimethoxyethane, 1,2-dimethoxymethane, dimethoxypropane, 1,3-dioxolane, tetrahydrofuran, 2-methyltetrahydrofuran, 4-methyl-1,3-dioxolane, and the like; and sulfolane. However, to increase the high voltage stability of the liquid ionic conductive material, esters are preferable and among them carbonic acid esters are particularly preferred.

Furthermore, the compound of the present invention can be used in the form of a solid ionic conductive material by producing the compound as a polymer or as an oligomer. An example of such a compound is shown below:

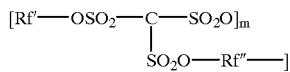

wherein Rf' is a fluoroalkylene group having from 1 to 20 carbon atoms; m indicates the degree of polymerization, which is generally from 2 to 100, or Rf' at the polymer chain end may be a group for completing the bonding such as a fluoroalkyl group and the like; and Rf" is a fluoroalkylene group or a fluoroalkyl group which may be bonded to the same or a different anion portion.

Hetero atoms such as oxygen or the like may be contained in the alkylene or alkyl groups. Furthermore, the structure of Rf' and Rf" may change for each unit, and Rf' and Rf" mean the molecular chain series containing F-atoms. Moreover, the carbon atom of Rf" which is bonded to the oxygen bonded to the resonance structure group has at least one H-atom or no F-atoms.

The polymer salt of the present invention and polymers such as polymethylmethacrylate, the above-mentioned organic solvent and the like can be used in a suitable mixture.

Additionally, the ionic conductive material of the present invention is more preferably used together with a support material, such as a porous polymer or an insulating inorganic compound (e.g., alumina, zeolite, etc.) or polyethylene oxide or polymethylmethacrylate or a derivative of these materials.

When preparing the ionic conductive material (electrolytic solution) in which the compound of the present invention is dissolved in an organic solvent, the concentration of the above compound is not particularly limited, but generally a concentration of about 0.01–2 mol/l, or more preferably 0.05–1 mol/l is preferred.

When the ionic conductive material of the present invention is used to assemble the electrochemical device, in particular, a non-aqueous cell, a negative electrode comprises an alkali metal or a compound containing an alkali metal which is unified with a current collector such as stainless steel netting.

Lithium, sodium, potassium, and the like can be given as examples of the alkali metals. Alloys of alkali metals with aluminum, lead, indium, potassium, cadmium, tin, magnesium, or the like can be given as examples of the compounds containing alkali metals. Further examples are compounds containing an alkali metal and a carbon material, and compounds having a lower potential (vs. Li/Li+) and comprising an alkali metal and a metal oxide or sulphide (e.g. $Li_xSnO_2$, etc.).

Active material such as, for example, metal oxides such as lithium cobalt oxide, lithium nickel oxide, $LiMn_2O_4$, manganese dioxide, vanadium pentoxide, chromium oxide, etc., or metal sulfides such as molybdenum disulfide, etc., may be used in the positive electrode. To complete the formation, a mixture with conductive materials and binding agents such as polytetrafluoroethylene, etc., and so on may be added as appropriate, and as a core, a current collector such as stainless steel netting may be used.

Because the compound of the present invention is stable at high voltages, the positive electrode active material preferably has a high utility value, for example, lithium cobalt oxide, lithium nickel oxide, $LiMn_2O_4$, or other such materials which when charged give high voltages of 4 V or greater, or preferably 4.2 V or greater, according to a lithium reference. And a material which has a valency of 3 or greater when dissolved in the liquid ionic conductive material, such as aluminum, tungsten, etc., is preferred as the positive electrode current collector.

Furthermore, when the amount of surface area of the positive electrode active material decreases, the storage stability is further improved. For the positive electrode active material used in the present invention, the surface area is preferably 50 $m^2/g$ or less, more desirably 30 $m^2/g$ or less, and at best 20 $m^2/g$.

In the following, the present invention will be explained more specifically through the given examples. However, the present invention is not limited to these examples.

EXAMPLES

Example 1

$(CF_3CH_2OSO_2)_3CLi$ was used as the electrolyte, and the liquid ionic conductive material (electrolytic solution) was prepared as given below. In the above $(CF_3CH_2OSO_2)_3CLi$, the C (carbon) atom serving as the anion center formed the $(-SO_2)_3C$ resonance structure and was bonded to the electron-withdrawing organic substituent $[CF_3CH_2]$ through an O (oxygen) atom.

The liquid ionic conductive material (electrolytic solution) was prepared by adding the above $(CF_3CH_2OSO_2)_3CLi$ to propylene carbonate and blending. The concentration of the electrolyte $(CF_3CH_2OSO_2)_3CLi$ in the electrolytic solution was 0.1 mol/l.

Separately from this, a conductive material, crystalline graphite, was added to $LiCoO_2$ in a weight ratio of 6:90 and the two were mixed together. This mixture was dispersed in a solution in which polyvinylidene fluoride was dissolved in N-methyl pyrolidone, and then blended well to give a slurry. This positive electrode mixture slurry was uniformly applied to the surface of a positive electrode current collector which was made from aluminum foil having a thickness of 20 $\mu$m. After drying, it was compression molded by a roller press machine and then cut into fixed dimensions. The positive electrode was completed on the welding on of the lead material.

The positive electrode was enveloped by a layer in which the lead material had been bonded to the lithium foil of the negative electrode through the aid of a separator made from 34 $\mu$m thick microporous polyethylene (porous polymer). Then, it was all inserted into a polyethylene bag. After the above liquid ionic conductive material had been injected in the back, the upper portion of the bag was sealed and, thus, an electrochemical device (a non-aqueous secondary cell) was made. Additionally, $(CF_3CH_2OSO_2)_3CLi$ used in the present invention has a melting point of about 140° C. The NMR analysis results were as follows.

| NMR | $^{19}F$; | $\delta CF_3$ | 73.37 ppm, | t, | $^3J(F-H)$ | 8.6 Hz |
|---|---|---|---|---|---|---|
| NMR | $^1H$; | $\delta CH_2$ | 4.57 ppm, | q | | |
| NMR | $^{13}C$; | $\delta CH_2$ | 65.50 ppm, | q, | $^2J(C-F)$ | 37.4 Hz |
| | | $\delta C$ | 83.39 ppm, | | | |
| | | $\delta CF_3$ | 124.09 ppm, | q, | $^1J(C-F)$ | 27.7 Hz |

Comparative Example 1

$(CF_3SO_2)NLi$ was dissolved instead of $(CF_3CH_2OSO_2)_3CLi$ and the composition was used to prepare an electrolytic solution given as 0.1 mol/l $(CF_3SO_2)NLi/PC$.

The PC in this electrolytic solution is an abbreviation of propylene carbonate. Therefore, the above electrolytic solution indicated as 0.1 mol/l $(CF_3SO_2)NLi/PC$ is an electrolytic solution in which $(CF_3SO_2)NLi$ is dissolved at 0.1 mol/l in the propylene carbonate solvent.

Apart from the use of this electrolytic solution, the electrochemical device (non-aqueous secondary cell) was prepared in the same manner as Example 1.

Comparative Example 2

$(CF_3SO_2)NLi$ was dissolved instead of $(CF_3CH_2OSO_2)_3CLi$ and the composition was used to prepare an electrolytic solution given as 0.1 mol/l $(CF_3SO_2)_3CLi/PC$.

The PC in this electrolytic solution is an abbreviation of propylene carbonate. Therefore, the above electrolytic solution indicated as 0.1 mol/l $(CF_3SO_2)_3CLi/PC$ is an electrolytic solution in which $(CF_3SO_2)_3CLi$ is dissolved at 0.1 mol/l in the propylene carbonate solvent. Measurements of the aluminum resistance to oxidation of the liquid ionic conductive materials (electrolytic solutions) as prepared above, in Example 1 and in Comparative Example 1 are as given in the following.

In the working electrode of the cell for the measurement of the oxidation stability (electrochemical device), an aluminum board having an area of 1 $cm^2$ and a thickness of 100 $\mu$m was used. For the counter electrode, lithium foil was used. A polyethylene microporous membrane (porous polymer) was arranged as a separator between the working and counter electrodes. The pre-determined liquid ionic conductive material (electrolytic solution) was injected into the cell and after completion of the evaluation cell, a Potentiostat (HA-501) and a Function Generator (HB-104), both manufactured by Hokuto Electrical Industries Ltd., were used and, scanning the electrical potential at a scanning speed of 5 mV/s, the rise in the electrical potential of the occurring electric current was investigated.

The aluminum oxidation potential measured in this way for the electrolytic solutions of each of the ionic conductive materials are shown in Table 1.

TABLE 1

| | Electrolyte | Aluminum Oxidation Potential (V vs. Li) |
|---|---|---|
| Example 1 | $(CF_3CH_2OSO_2)_3CLi$ | 5.5 |
| Comparative Example 1 | $(CF_3SO_2)_2NLi$ | 4.0 |

TABLE 1-continued

| Electrolyte | | Aluminum Oxidation Potential (V vs. Li) |
|---|---|---|
| Comparative Example 2 | $(CF_3SO_2)_3CLi$ | 4.6 |

As shown in Table 1, the ionic conductive material of Example 1, which used the compound of the present invention, showed high aluminum oxidation potential.

Next, cells of the above Example 1 and Comparative Example 1 were charged for 3 hours at 0.5 mA/cm² in a dry atmosphere and the charging was terminated at the maximum voltage of 4.2 V. Then, they were discharged to 2.75 V at 0.5 mA/cm² and the discharge capacity was investigated. The results of the discharge capacity are shown in Table 2 as a ratio with the discharge capacity of Example 1 being 100 (capacity ratio).

TABLE 2

| | Capacity Ratio |
|---|---|
| Example 1 | 100 |
| Comparative Example 1 | 11 |

As shown in Table 2, the capacity ratio for the cell of Example 1 is larger compared to the capacity ratio for the cell of Comparative Example 1, and through the use of the ionic conductive material of the present invention, the discharge capacity is larger when charging at high voltages.

As given in the explanations above, in the present invention, an ionic conductive material and an electrochemical device with excellent high voltage stability can be provided by the use in the ionic conductive material of a compound such as $(CF_3CH_2OSO_2)_3CLi$ with a metal ion or a hydrogen ion as the counter ion and the anion portion being formed from a resonance structure which includes a Group IVB atom and which is bonded to an electron-withdrawing organic substituent through a Group VIB atom.

What is claimed is:

1. An ionic conductive material having a counter ion chosen from a metal ion or a hydrogen ion and an anion portion comprising a resonance structure portion containing a Group IVB atom and an organic electron withdrawing group which is bonded to said resonance structure portion through a Group VIB atom, wherein the electron withdrawing group can only be bonded through the Group VIB atom.

2. The ionic conductive material as claimed in claim 1 wherein the counter ion is a metal ion, the Group VIB atom is an oxygen atom and the atom in said organic group which is bonded to said oxygen atom is not bonded to a halogen or is bonded to at least one hydrogen atom.

3. The ionic conductive material as claimed in claim 1 wherein said compound is represented by the following formula:

$$\{(Rf\text{—}O\text{—}Y)_3C\}_nM$$

where

M is a metal providing a counter ion;
n is an integer value for a valence of the metal M;
C is a carbon atom as a Group IVB atom;
$(\text{—}Y)_3C$ is said resonance structure;
Y is an $\text{—}SO_2\text{—}$ or a $\text{—}CO\text{—}$ group;

Rf is an organic electron-withdrawing group including at least one fluorine atom, and no halogen atom is bonded or at least one hydrogen atom is bonded to the atom in said Rf which is bonded to said oxygen atom, and furthermore, the Rf may be bonded in two or more positions to O—Y inside the same anion group or to an O—Y of another anion group.

4. The ionic conductive material as claimed in claim 3, wherein $\{(Rf\text{—}O\text{—}Y)_3C\}_nM$ is selected from the group consisting of $(CF_3CH_2OSO_2)_3CLi$, $(CF_3CF_2CH_2OSO_2)_3CLi$, and $((CF_3)_2CHOSO_2)_3CLi$.

5. The ionic conductive material as claimed in claim 1 wherein said resonance structure has a $\text{—}SO_2\text{—}$ group or a $\text{—}CO\text{—}$ group.

6. The ionic conductive material as claimed in claim 1 wherein said electron withdrawing group is a halogenated acyl group or a cyano group.

7. The ionic conductive material as claimed in claim 1, wherein the compound is a polymer or an oligomer.

8. The ionic conductive material as claimed in claim 7, wherein the polymer has the following structure:

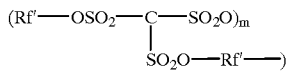

wherein Rf' is a fluoralkylene group having from 1 to 20 carbon atoms;
m indicates the degree of polymerization, which is generally about 2–100;
Rf' is a fluoralkyl group; and
Rf" is a fluoralkylene group or a fluoralkyl group.

9. The ionic conductive material as claimed in claim 2, wherein the compound is a polymer or an oligomer.

10. The ionic conductive material as claimed in claim 9, wherein the polymer has the following structure:

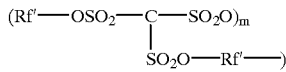

wherein Rf' is a fluoralkylene group having from 1 to 20 carbon atoms;
m indicates the degree of polymerization, which is generally about 2–100;
Rf' is a fluoralkyl group; and
Rf" is a fluoralkylene group or a fluoralkyl group.

11. An electrochemical device comprising an ionic conductive material as claimed in claim 1.

12. The electrochemical device as claimed in claim 11, wherein the ionic conductive material is dissolved in an organic solvent.

13. The electrochemical device as claimed in claim 12, wherein a concentration of the ionic conductive material in the organic solvent is about 0.01–2 mol/l and preferably from about 0.05–1 mol/l.

14. The electrochemical device as claimed in claim 12, wherein the organic solvent is selected from group consisting of propylene carbonate, ethylene carbonate, butylene carbonate, γ-butyrolactone, γ-valerolactone, dimethyl carbonate, methyl propionate butyl acetate, 1,2-dimethoxyethane, 1,2-dimethoxymethane, dimethoxypropane, 1,3-dioxolane, tetrahydrofuran, 2-methyltetrahydrofuran, 4-mehtyl-1,3-dioxolane and sulfolane.

15. The electrochemical device as claimed in claim 11 wherein said resonance structure has a —$SO_2$— group or a —CO— group.

16. The electrochemical device as claimed in claim 11 wherein said electron withdrawing group is a halogenated acyl group or a cyano group.

17. An electrochemical device comprising an ionic conductive material as claimed in claim 2.

18. The electrochemical device as claimed in claim 17, wherein the ionic conductive material is dissolved in an organic solvent.

19. The electrochemical device as claimed in claim 18, wherein a concentration of the ionic conductive material in the organic solvent is about 0.01–2 mol/l and preferably about 0.05–1 mol/l.

20. The electrochemical device as claimed in claim 18, wherein the organic solvent is selected from group consisting of propylene carbonate, ethylene carbonate, butylene carbonate, γ-butyrolactone, γ-valerolactone, dimethyl carbonate, methyl propionate butyl acetate, 1,2-dimethoxyethane, 1,2-dimethoxymethane, dimethoxypropane, 1,3-dioxolane, tetrahydrofuran, 2-methyltetrahydrofuran, 4-mehtyl-1,3-dioxolane and sulfolane.

21. An electrochemical device comprising an ionic conductive material as claimed in claim 3.

22. The electrochemical device as claimed in claim 21, wherein the ionic conductive material is dissolved in an organic solvent.

23. The electrochemical device as claimed in claim 21, wherein a concentration of the ionic conductive material in the organic solvent is about 0.01–2 mol/l and preferably from about 0.05–1 mol/l.

24. The electrochemical device as claimed in claim 21, wherein the organic solvent is selected from group consisting of propylene carbonate, ethylene carbonate, butylene carbonate, γ-butyrolactone, γ-valerolactone, dimethyl carbonate, methyl propionate butyl acetate, 1,2-dimethoxyethane, 1,2-dimethoxymethane, dimethoxypropane, 1,3-dioxolane, tetrahydrofuran, 2-methyltetrahydrofuran, 4-mehtyl-1,3-dioxolane and sulfolane.

* * * * *